(12) United States Patent
Said et al.

(10) Patent No.: US 7,324,132 B2
(45) Date of Patent: Jan. 29, 2008

(54) IMAGING THREE-DIMENSIONAL OBJECTS

(75) Inventors: Amir Said, Cupertino, CA (US);
Ramin Samadani, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 862 days.

(21) Appl. No.: 10/430,462

(22) Filed: May 6, 2003

(65) Prior Publication Data
US 2004/0223077 A1     Nov. 11, 2004

(51) Int. Cl.
*H04N 7/18*     (2006.01)
*H04N 9/47*     (2006.01)
*H04N 7/00*     (2006.01)
*G02B 26/08*    (2006.01)

(52) U.S. Cl. .................. 348/146; 348/37; 359/196; 359/216

(58) Field of Classification Search .......... 348/36, 348/37, 142, 146; 359/219–221, 212
See application file for complete search history.

(56) References Cited

U.S. PATENT DOCUMENTS

| | | |
|---|---|---|
| 3,752,998 A | 8/1973 | Stripling et al. |
| 4,030,807 A | 6/1977 | Briney |
| 4,039,246 A | 8/1977 | Voigt |
| 4,266,846 A | 5/1981 | Ih |
| 4,650,997 A * | 3/1987 | Yawn et al. ............. 250/236 |
| 4,966,436 A | 10/1990 | Mayhew et al. |
| 5,054,930 A | 10/1991 | Adelson |
| 5,101,268 A | 3/1992 | Ohba |
| 5,528,279 A | 6/1996 | Suzuki et al. |
| 5,671,055 A | 9/1997 | Whittlesey et al. |
| 5,848,188 A | 12/1998 | Shibata et al. |
| 5,870,220 A | 2/1999 | Migdal et al. |
| 6,057,827 A | 5/2000 | Matthews |
| 6,081,273 A | 6/2000 | Weng et al. |
| 6,128,086 A | 10/2000 | Fowler et al. |
| 6,205,243 B1 | 3/2001 | Migdal et al. |
| 6,377,865 B1 | 4/2002 | Edelsbrunner et al. |
| 2003/0160970 A1 * | 8/2003 | Basu et al. ............. 356/601 |

\* cited by examiner

*Primary Examiner*—Lin Ye
*Assistant Examiner*—Kelly Jerabek

(57) ABSTRACT

Imaging systems and methods are described. In one aspect, an imaging system includes a light source that is operable to generate a beam of light directed along a beam path and an optical element that is operable to rotate about a rotational axis. The optical element has two or more optical faces that are positionable to intersect the beam path over respective non-overlapping ranges of rotational positions of the optical element. At least two different optical faces are operable to scan the beam of light in different respective scan planes during rotation of the optical element. In an imaging method, a beam of light directed along a beam path is generated. The beam path is consecutively intersected with at least two different optical faces to scan the light beam in different respective scan planes.

22 Claims, 3 Drawing Sheets

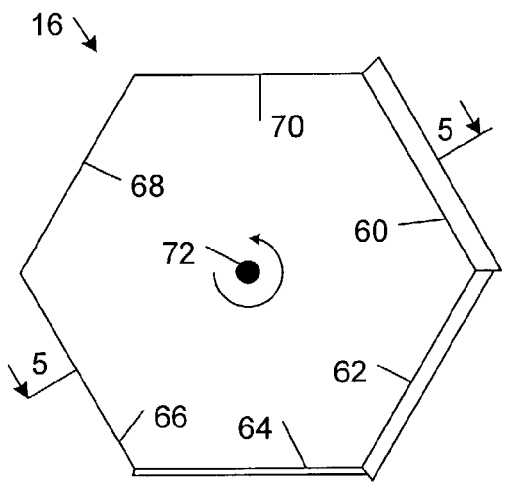
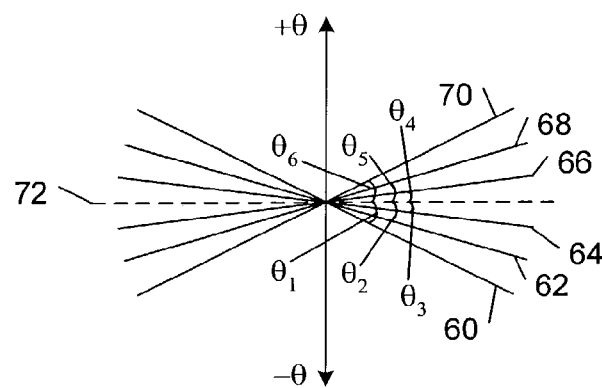
FIG. 4A
FIG. 4B
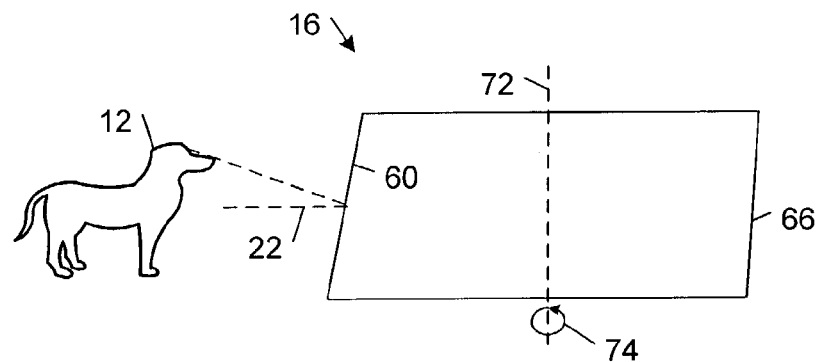
FIG. 5A
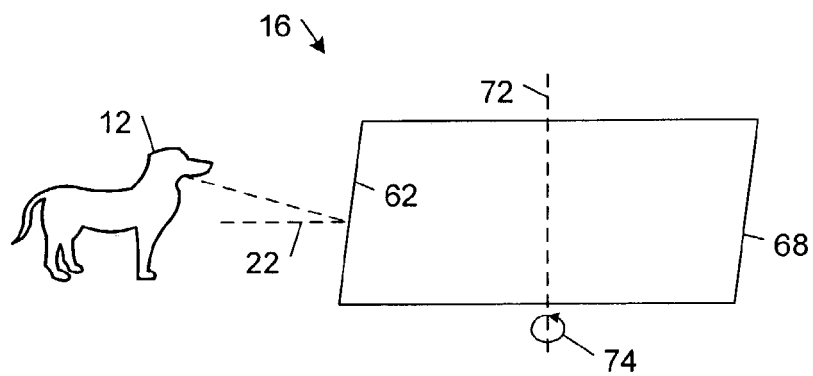
FIG. 5B

IMAGING THREE-DIMENSIONAL OBJECTS

TECHNICAL FIELD

This invention relates to systems and methods of imaging three-dimensional objects.

BACKGROUND

There is a growing interest within the design, manufacturing, and graphics communities in building systems and methods for digitizing the shape and appearance of three-dimensional objects. In general, these systems and methods involve obtaining information about an object and then transforming the shape, contour, color, and other information into a digitized model of the object. A digitized model of the shape and appearance of a physical object may have many applications, including: product design; reverse engineering; museum archiving; creation of models for visual simulation, movie making, videogames, and home shopping; architectural preservation; engineering retrofits; virtual reality flythroughs; and archiving importance objects, such as sculptures, historic buildings, and archeological sites. A physical replica of an object may be produced from a digitized model using a rapid prototyping technology, such as stereolithography. Other fields that may benefit from three-dimensional object shape and appearance information include reconstructive and plastic surgery, dentistry, biology, and internal medicine.

In one class of three-dimensional object scanning systems, a triangulation system projects beams of light on an object and determines three-dimensional spatial locations of points where the light reflects from the object. Based on the reflected light, the triangulation system determines the coordinates of the points of reflection by triangulation. A single dot scanning system sweeps a single beam of light over the object, whereas a scan line system sweeps a plane of light across the object. A single dot scanning system with a linear reflected light position detector can digitize only a single point at a time. Single dot scanning systems typically are used for applications, such as industrial engineering, in which scanning speed is not critical. Scan line systems typically detect reflected scan lines with a two-dimensional imager, such as a charged coupled device (CCD) camera, which may be mounted on a rotating arm or a moving platform. Typically in such systems, either the object moves relative to the camera and line scanner or the camera and line scanner move around the object.

In one approach, a shape digitizing system includes two laser stripe scanners that are operable to simultaneously scan two light beams in two dimensions across a three-dimensional object. Each laser stripe scanner includes a laser stripe generator that is configured to project a flat plane of light and a galvanometric scanner that includes a motor and a rotatable mirror.

Other systems for scanning light beams have been proposed. For example, in one approach, a scanning system includes two laser sources that are configured to produce respective laser beams that are directed toward a rotating polygonal mirror along different beam paths. In this system, the polygonal mirror scans the laser beams in the same direction and in the same scan plane, but delayed in time with respect to each other. In another approach, a two-dimensional serial and field multiplexing holographic scanner includes multiple rows of holograms on a disk to achieve serial multiplexing and a reflector to focus a scanning beam on different field points to achieve field multiplexing.

SUMMARY

In one aspect, the invention features an imaging system that includes a light source that is operable to generate a beam of light directed along a beam path and an optical element that is operable to rotate about a rotational axis. The optical element has two or more optical faces that are positionable to intersect the beam path over respective non-overlapping ranges of rotational positions of the optical element. At least two different optical faces are operable to scan the beam of light in different respective scan planes during rotation of the optical element.

In another aspect, the invention features an imaging method in accordance with which a beam of light directed along a beam path is generated. The beam path is consecutively intersected with at least two different optical faces to scan the light beam in different respective scan planes.

Other features and advantages of the invention will become apparent from the following description, including the drawings and the claims.

DESCRIPTION OF DRAWINGS

FIG. 4A is a diagrammatic top view of another exemplary optical element embodiment.

FIG. 4B is a graph diagrammatically illustrating the angles at which the optical faces of the optical element of FIG. 4A are oriented relative to a common rotational axis.

FIGS. 5A and 5B are diagrammatic cross-sectional side views of the optical element embodiment of FIG. 4A taken along the line 5-5.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1A:
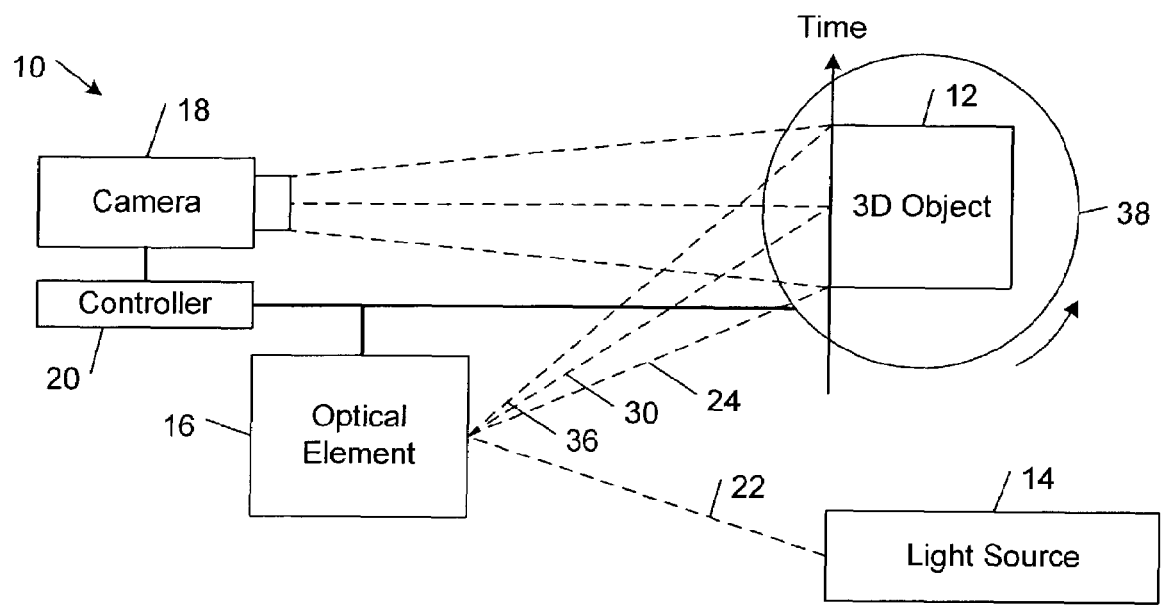
FIG. 1A is diagrammatic view of an exemplary imaging system embodiment.
Figure 1B:
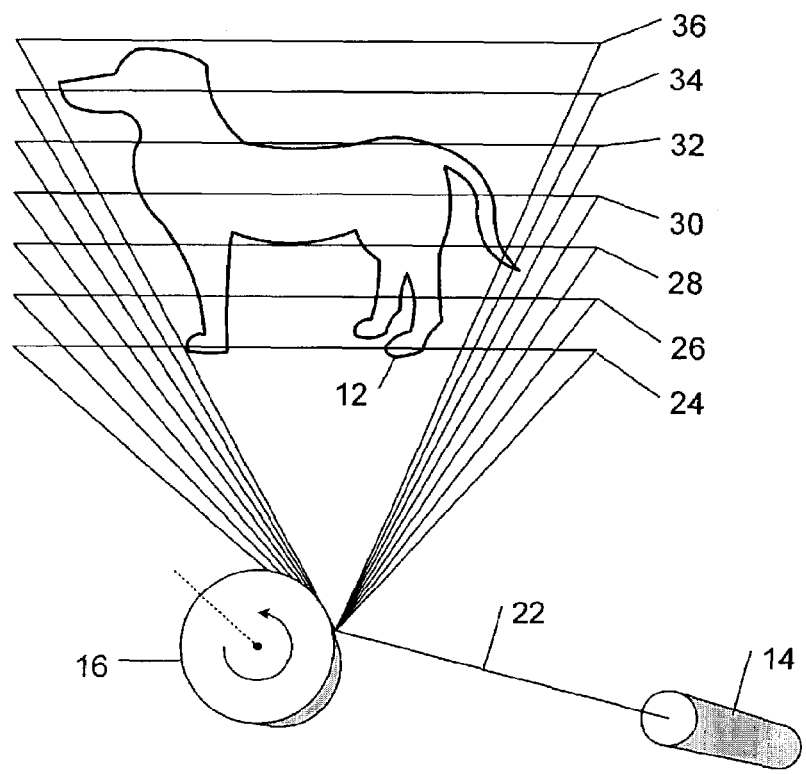
FIG. 1B is a diagrammatic front view of an optical element scanning a light beam from the light source of FIG. 1A in multiple different scan planes intersecting a three-dimensional object.

Referring to FIG. 1, in some embodiments, an imaging system 10 that is operable to capture shape and appearance information from a three-dimensional object 12 includes a light source 14, an optical element 16, a camera 18, and a controller 20. Light source 14 (e.g., a semiconductor laser light source) is operable to generate a beam of laser light 22 that is directed along a beam path intersected by optical element 16. As explained in detail below, optical element 16 is operable to rotate about a rotational axis. Optical element 16 has two or more optical faces each of which can be positioned to intersect the beam path over respective non-overlapping ranges of rotational positions of the optical element 16. At least two different optical faces are operable to scan light beam 22 in different respective scan planes 24, 26, 28, 30, 32, 34, 36. Camera 18 (e.g., a digital camera or digital video camera) is operable to capture images of scan lines reflecting from object 12. In some embodiments, camera 18 is configured to capture multiple reflected scan lines in a single image. In the illustrated embodiment, object 12 is supported on a platform 38 that is operable to rotate about a rotational axis so as to position object 12 at different rotational positions intersecting the scan planes 24-36.

Controller 20 is operable to direct camera 18 to capture scan line images for each of multiple rotational positions of the platform 38. Controller 20 also is operable to synchronize the operations of the optical element 16, camera 18, and platform 38. The controller 20 is not limited to any particular hardware or software configuration, but rather it may be implemented in any computing or processing environment, including in digital electronic circuitry or in computer hardware, firmware, or software. The controller 20 may be implemented, in part, in a computer process product tangibly embodied in a machine-readable storage device for execution by a computer processor. In some embodiments, controller 18 is implemented in a high level procedural or object oriented processing language; however, the algorithms may be implemented in assembly or machine language, if desired. In any case, the processing language may be a compiled or interpreted language. The controller methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Any of the foregoing technologies may be supplemented by or incorporated in specially designed ASICs (application-specific integrated circuits).

The two-dimensional contour line images that are created by reflected and scanned light beam 22 and captured by camera 18 may be used to compute a three-dimensional model of the surfaces of object 12 that are scanned in each image based on known triangulation techniques. In general, such triangulation techniques are based on the known relative positions and orientations of light source 14, optical element 16, and camera 18. The data that is computed from images taken from different rotational positions of platform 38 may be stitched together to obtain a complete three-dimensional model of the object 12 using known image stitching techniques.

Optical element 16 includes a motor (e.g., an alternating current or direct current electric motor with a gear head; not shown). In some embodiments, the motor rotates at a constant speed that may be selected based on the size of the area to be imaged and the image capture rate of camera 18. For example, in some embodiments, the motor may rotate fast enough for the camera 18 to capture in a single image of all of the scan lines reflected from the surfaces of object 12 intersecting the different scan planes 24-36.

Figure 2A:
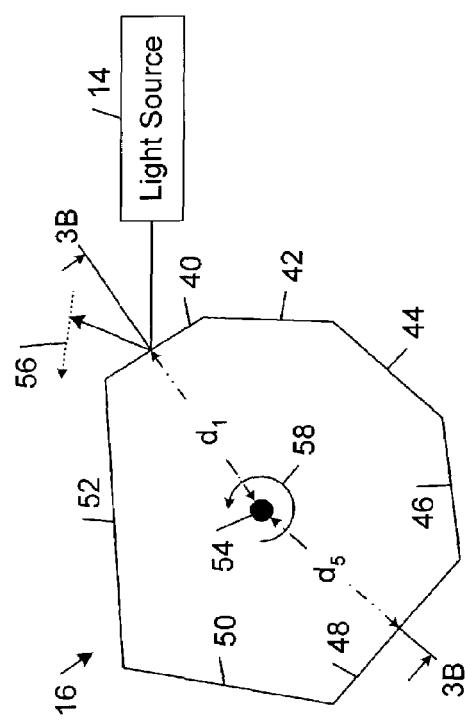
FIG. 2A is a diagrammatic top view of an exemplary optical element embodiment having multiple optical faces intersecting a light beam path over respective non-overlapping ranges of rotational positions of the optical element.
Figure 3A:
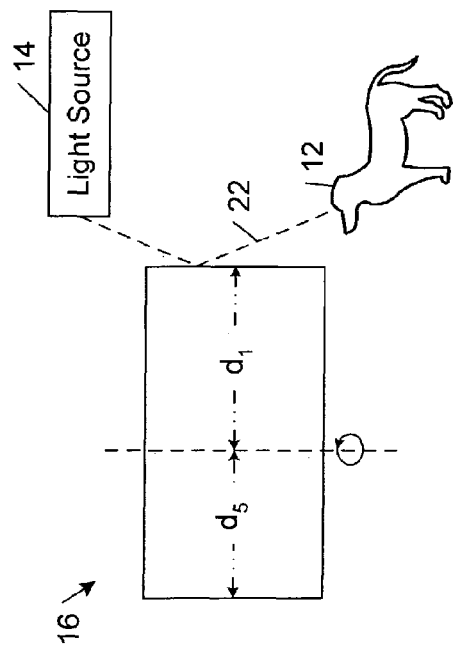
FIG. 3A is a diagrammatic top view of the optical element embodiment of FIG. 2A rotated so that a different optical face intersects the light beam path of FIG. 2A.
Figure 2B:
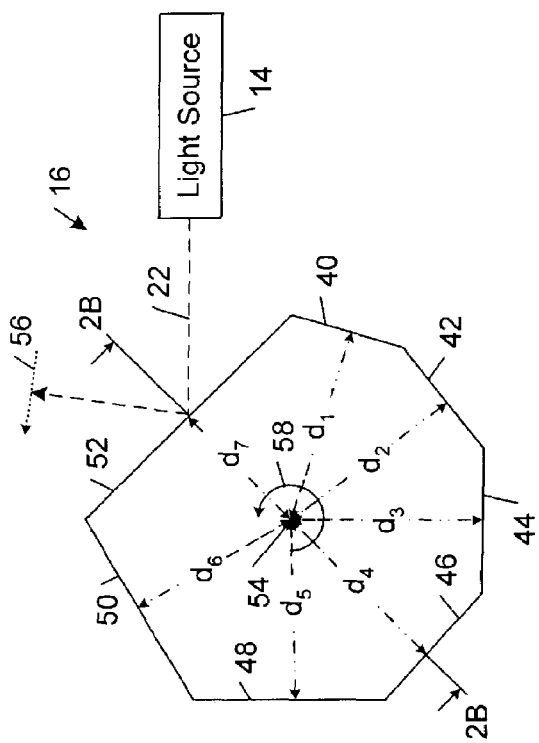
FIG. 2B is a diagrammatic cross-sectional side view of the optical element embodiment of FIG. 2A taken along the line 2B-2B.
Figure 3B:
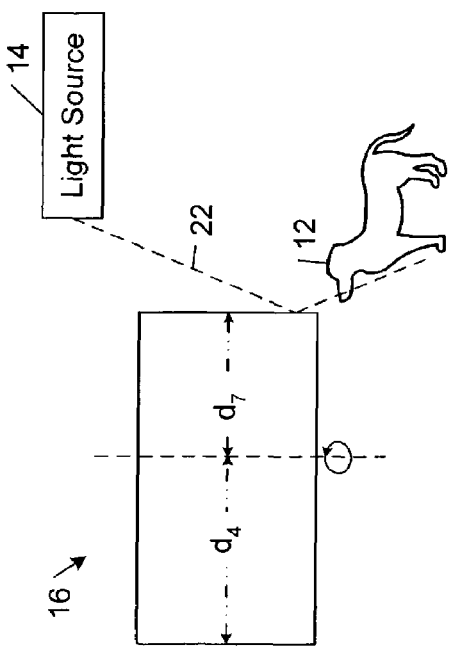
FIG. 3B is a diagrammatic cross-sectional side view of the optical element embodiment of FIG. 3A taken along the nonlinear line 3B-3B.

Referring to FIGS. 2A and 2B, in one embodiment, optical element 16 also includes a polygonal mirror with multiple asymmetrical, reflective optical faces 40, 42, 44, 46, 48, 50, 52. There are seven optical faces 40-52 in the illustrated embodiment; other embodiments may include a greater or lesser number of optical faces. In the illustrated embodiment, each reflective optical face 40-52 includes a planar mirror surface. The optical faces 40-52 are substantially parallel with respect to a common rotational axis 54 and are located at different respective distances ($d_1$, $d_2$, $d_3$, $d_4$, $d_5$, $d_6$, and $d_7$) from the rotational axis 54. In the illustrated embodiment, the separation distances are ordered in a sequence such that $d_1 > d_2 > d_3 > d_4 > d_5 > d_6 > d_7$. In other embodiments, however, the separation distances ($d_1$, $d_2$, $d_3$, $d_4$, $d_5$, $d_6$, and $d_7$) may have different sequence of relative distance values. In the illustrated embodiment, each optical face 40-52 is separated from the rotational axis 54 by a distance that is different from all of the other separation distances. In other embodiments, one or more groups of two or more optical faces may be separated from rotational axis 54 by the same distance.

Referring to FIGS. 2A, 2B, 3A, and 3B, in operation, light beam 22 from light source 14 reflects from the surface of optical face 52 and scans across scan plane 24 (FIG. 1B) in a scanning direction 56 (i.e., directed into the plane of the drawing sheet in FIG. 2A) as optical element 16 rotates in a direction 58. This sweep of light beam 22 traces a line across the bottom of object 12. After optical element 16 has rotated through a range of rotational positions corresponding to optical face 52, light beam 22 impinges on optical face 40. As optical element 16 continues to rotate, light beam 22 reflects from the surface of optical face 40 and scans across scan plane 36 (FIG. 1B) in scanning direction 56. The scanning process is repeated consecutively at each optical face 40-52. In this embodiment, the different respective scan planes 24-36 are substantially parallel.

Because the width dimensions along which light beam 22 traces across optical faces 40-52 are different in the illustrated embodiment, the widths of the corresponding scan lines that are traced across object 12 also will be different. In other embodiments, the scan widths of two or more optical faces may be made to be substantially the same by, for example, rendering certain regions of the optical faces non-reflective or by controlling the light source to impinge upon each optical face for the same length of time (e.g., the length of time need to trace across the narrowest optical face 40).

Referring to FIGS. 4A and 4B, in another embodiment, optical element 16 includes a polygonal mirror with multiple asymmetrical, reflective optical faces 60, 62, 64, 66, 68, 70. There are six optical faces 60-70 in the illustrated embodiment; other embodiments may include a greater or lesser number of optical faces. In the illustrated embodiment, each reflective optical face 60-70 includes a planar mirror surface. The optical faces 60-70 are oriented at different respective angles ($\theta_1$, $\theta_2$, $\theta_3$, $\theta_4$, $\theta_5$, and $\theta_6$) with respect to a common rotational axis 72. In the illustrated embodiment, the orientation angles are ordered in a sequence such that $\theta_1 < \theta_2 < \theta_3 < \theta_4 < \theta_5 < \theta_6$. In other embodiments, however, the orientation angles ($\theta_1$, $\theta_2$, $\theta_3$, $\theta_4$, $\theta_5$, and $\theta_6$) may have different sequence of relative angle values. In the illustrated embodiment, each optical face 60-70 is oriented at an angle with respect to the rotational axis 72 that is different from all of the other orientation angles. In other embodiments, one or more groups of two or more optical faces may be oriented at the same orientation angle with respect to rotational axis 72.

Referring to FIGS. 5A and 5B, as optical element 16 rotates in a direction 74, light beam 22 reflects from the surface of optical face 60 and scans across a top scan plane in a scanning direction that is directed out of the plane of the drawing sheet in FIG. 5A. This sweep of light beam 22 traces a line across the top of object 12. After optical element 16 has rotated through a range of rotational positions corresponding to optical face 60, light beam 22 impinges on optical face 62. As optical element 16 continues to rotate, light beam 22 reflects from the surface of optical face 62 and scans across a second scan plane (which is just below the top scan plane) in a scanning direction that is directed out of the plane of the drawing sheet in FIG. 5A. The scanning process is repeated consecutively at each optical face 60-70. In this embodiment, the different respective scan planes intersect the rotational axis at different angles.

Other embodiments are within the scope of the claims.

For example, although the above imaging embodiments have been described in connection with reflective-type optical elements, these imaging embodiments readily may be implemented using refractive-type optical elements.

What is claimed is:

1. An imaging system, comprising:
   a light source operable to generate a beam of light directed along a beam path;
   an optical element operable to rotate about a rotational axis and having first and second optical faces respectively positionable to intersect the beam path over first and second non-overlapping ranges of rotational positions of the optical element, wherein
      during rotation of the optical element through the first non-overlapping range of rotational positions in which the first optical face intersects the beam path, the light beam sweeps across a first scan plane, and
      during rotation of the optical element through the second non-overlapping range of rotational positions in which the second optical face intersects the beam path, the light beam sweeps across a second scan plane different from the first scan plane; and
   a camera operable to generate image data from the light beam reflecting from different first and second scan lines along which an object respectively intersects the first and second scan planes, wherein the first scan line is traced across the object during rotation the first optical face through the beam path and the second scan line is traced across the object during rotation of the second optical face through the beam path.

2. The imaging system of claim 1, wherein each of the first and second optical faces reflects the beam of light.

3. The imaging system of claim 2, wherein each of the first and second optical faces is a planar mirror.

4. The imaging system of claim 1, wherein the first optical face intersects the beam of light over a first range of locations along the beam path and the second optical face intersects the beam of light over a second range of locations along the beam path, the first and second ranges of locations being different.

5. The imaging system of claim 4, wherein the first and second optical faces are parallel to the rotational axis and the first and second optical faces are spaced at different respective distances from the rotational axis.

6. The imaging system of claim 1, wherein the first and second scan planes are substantially parallel to each other.

7. The imaging system of claim 1, wherein the first and second optical faces are oriented at different respective angles relative to the rotational axis.

8. The imaging system of claim 1, wherein the first and second scan planes intersect the rotational axis at different respective angles.

9. The imaging system of claim 1, wherein the first and second optical faces trace the first and second scan lines in directions perpendicular to the rotational axis during rotation of the optical element.

10. The imaging system of claim 1, further comprising a platform operable to rotate about a rotational axis and operable to support the object at different rotational positions intersecting the first and second scan planes.

11. The imaging system of claim 10, wherein the camera is operable to capture images of scan lines reflecting from the object supported on the platform.

12. The imaging system of claim 11, further comprising a controller operable to direct the camera to capture scan line images for each of multiple rotational positions of the platform.

13. The imaging system of claim 12, wherein the controller is operable to synchronize the camera with rotation of the platform.

14. The imaging system of claim 11, wherein the camera is configured to capture multiple ones of the scan lines in each image.

15. The imaging system of claim 1, wherein the light source position and orientation are fixed relative to the optical element.

16. An imaging method, comprising:
    generating a beam of light directed along a beam path;
    intersecting the beam path with first and second optical faces, wherein
       during the intersecting of the beam path with the first optical face, the light beam sweeps across a first scan plane, and
       during the intersecting of the beam path with the second optical face, the light beam sweeps across a second scan plane different from the first scan plane; and
    generating image data from the light beam reflecting from different first and second scan lines along which an object respectively intersects the first and second scan planes, wherein the first scan line is traced across the object over a first period during which the beam path intersects the first optical face and the second scan line is traced across the object over a second period during which the beam path intersects the second optical face.

17. The imaging method of claim 16, wherein the intersecting comprises intersecting the beam of light with first optical face over a first range of locations along the beam path and intersecting the beam of light with the second optical face over a second range of locations along the beam path, the first and second ranges of locations being different.

18. The imaging method of claim 16, wherein the first and second scan planes are substantially parallel to each other.

19. The imaging method of claim 16, wherein the intersecting comprises rotating the first and second optical faces about a rotational axis and the first and second scan planes intersect the rotational axis at different respective angles.

20. The imaging method of claim 16, further comprising rotating the object about a rotational axis at different rotational positions intersecting the first and second scan planes.

21. The imaging method of claim 20, wherein the generating comprises capturing images of scan lines reflecting from the object at the different rotational positions.

22. The imaging method of claim 16, wherein the intersecting comprises rotating the first and second optical faces about a rotational axis, the first and second optical faces are parallel to the rotational axis during the rotating, and the first and second optical faces are spaced at different respective distances from the rotational axis during the rotating.

* * * * *